(12) United States Patent
Maruoka

(10) Patent No.: US 8,167,016 B2
(45) Date of Patent: May 1, 2012

(54) HEAVY-LOAD TIRE WITH WIND BEAD STRUCTURE

(75) Inventor: Kiyoto Maruoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/047,204

(22) Filed: Mar. 14, 2011

(65) Prior Publication Data

US 2011/0162775 A1 Jul. 7, 2011

Related U.S. Application Data

(62) Division of application No. 12/149,239, filed on Apr. 29, 2008, now Pat. No. 7,997,318.

(30) Foreign Application Priority Data

May 14, 2007 (JP) ................................. 2007-128167
Jul. 12, 2007 (JP) ................................. 2007-183442

(51) Int. Cl.
  *B60C 15/06* (2006.01)
  *B60C 15/00* (2006.01)
(52) U.S. Cl. ...................... 152/541; 152/543; 152/552
(58) Field of Classification Search .................. 152/541, 152/543, 552
See application file for complete search history.

(56) References Cited

U.S. PATENT DOCUMENTS 6,530,411 B1 * 3/2003 Tsukagoshi et al. .......... 152/552
2006/0207710 A1 * 9/2006 Yoshikawa et al. ....... 152/552 X

FOREIGN PATENT DOCUMENTS

| JP |   02133208 A | * | 5/1990 |
| JP | 2002-205508 A |   | 7/2002 |
| JP |  2007230400 A | * | 9/2007 |
| JP |  2007230515 A | * | 9/2007 |
| JP |  2008001201 A | * | 1/2008 |
| JP |  2008001202 A | * | 1/2008 |

* cited by examiner

*Primary Examiner* — Adrienne C. Johnstone
(74) *Attorney, Agent, or Firm* — Birch, Stewart, Kolasch & Birch, LLP

(57) ABSTRACT

A heavy-load tire has a wind bead structure in which a turned-up portion of a carcass ply is wound around a bead core, in which a bead portion is equipped with a bead reinforcing layer having a u-shaped cross section and a bead apex rubber having a triangular-shaped cross section. The turned-up portion has an auxiliary turned-up portion passing through the vicinity of a radially outer side of the bead core. The bead apex rubber includes a high complex elasticity modulus inner apex portion disposed at a radially inner side and a low complex elasticity modulus outer apex portion disposed at a radially outer side.

6 Claims, 11 Drawing Sheets

HEAVY-LOAD TIRE WITH WIND BEAD STRUCTURE

This application is a Divisional of application Ser. No. 12/149,239, filed on Apr. 29, 2008, now U.S. Pat. No. 7,997,318, issued Aug. 16, 2011. Priority is also claimed to Japanese Application No. 2007-183442 filed on Jul. 12, 2007 and Japanese Application No. 2007-128167 filed on May 14, 2007. The entire contents of each of these applications is hereby incorporated by reference.

TECHNICAL FIELD

The present invention relates to a heavy-load tire with improved durability of a bead portion.

BACKGROUND OF THE INVENTION

Conventionally, as shown in FIG. 12, various heavy-load tires having a so-called wind bead structure in which a turned-up portion b2 of a carcass ply b is wound around a bead core c have been proposed. Such a heavy-load tire can prevent damages arising from an end portion of the turned-up portion b2 because the end portion of the turned-up portion b2 is disposed near the bead core c, which is less susceptible to distortion during driving. As a result, such a heavy-load tire has an outstanding advantage in that the bead durability can be improved.

with the wind bead structure, the bead deformation at the time of grounding is relatively large as compared with a conventional non-wind bead structure. Therefore, a bead reinforcing layer f becomes necessary which has a reinforcing cord such as a steel cord and which reinforces a bead portion by being turned up around the bead portion into a U shape.

DISCLOSURE OF THE INVENTION

Problems to be Solved by the Invention

However, when such a bead reinforcing layer f is provided, a large shearing force acts on an outer end ft of an outer piece portion f1 of the bead reinforcing layer f, and thus, for example, rubber separation (cord loose) is likely to occur at the outer end ft. Thus, there is room for further improvement for the bead durability.

The present invention aims to provide a heavy-load tire having a wind bead structure which can improve the bead durability.

Means for Solving the Problem

According to a first aspect of the invention, a heavy-load tire includes: a carcass having one carcass ply having a body portion extensive from a tread portion through a side wall portion to a bead core in a bead portion and a turned-up portion which extends from the body portion, which is turned up from an axially inner side to an axially outer side over the bead core, and which has an auxiliary turned-up portion; a bead reinforcing layer which is disposed at the bead portion and has a reinforcing cord; and a bead apex rubber which is disposed farther radially outwardly than the auxiliary turned-up portion of the carcass ply and which extends radially outwardly in a tapering manner.

The turned-up portion has: a main turned-up portion which curves along an axially inner side, a radially inner side, and an axially outer side of the bead core; and the auxiliary turned-up portion which extends from the main turned-up portion and extends toward the body portion through a vicinity of a radially outer side of the bead core.

The bead reinforcing layer has a u-shaped cross section including: an intermediate portion which extends farther radially inwardly than the main turned-up portion and along the main turned-up portion; an outer piece portion which extends from an axially outer side of the intermediate portion and which extends radially outwardly away from the turned-up portion; and an inner piece portion which extends from an axially inner side of the intermediate portion and which extends radially outwardly along the axially inner side of the body portion.

The reinforcing cord of the bead reinforcing layer has a cord strength of 700 to 1200 N and the reinforcing cord inclines at an angle of 40 to 70° relative to a circumferential direction of the tire at the outer piece portion.

The bead apex rubber has: an inner apex portion which is formed of a high complex elasticity modulus rubber and is disposed at a radially inner side; and an outer apex portion which is formed of a rubber whose complex elasticity modulus is lower than that of the rubber of the inner apex portion and is disposed at a radially outer side.

The inner apex portion has an L-shaped cross section including: a bottom piece portion along a radially outer side of the auxiliary turned-up portion; and a raised piece portion which rises at an axially inner end side of the bottom piece portion and extends radially outwardly in a tapering manner along the body portion of the carcass ply.

According to a second aspect of the invention, a heavy-load tire includes: a carcass having one carcass ply having a body portion extensive from a tread portion through a side wall portion to a bead core in a bead portion and a turned-up portion which extends from the body portion, which is turned up from an axially inner side to an axially outer side over the bead core, and which has an auxiliary turned-up portion; and a bead reinforcing layer which is disposed at the bead portion and has a reinforcing cord.

The turned-up portion has: a main turned-up portion which curves along an axially inner side, a radially inner side, and an axially outer side of the bead core; and the auxiliary turned-up portion which extends from the main turned-up portion and extends toward the body portion through a vicinity of a radially outer side of the bead core.

The bead reinforcing layer has a U-shaped cross section including: an intermediate portion which extends farther radially inwardly than the main turned-up portion and along the main turned-up portion; an outer piece portion which extends from an axially outer side of the intermediate portion and which extends radially outwardly away from the turned-up portion; and an inner piece portion which extends from an axially inner side of the intermediate portion and which extends radially outwardly along the axially inner side of the body portion.

The bead portion is provided with a heel cover layer formed of a cord ply having an organic fiber cord at least one portion of an outer side of a heel area defined below, and the organic fiber cord of the heel cover layer is arranged at an angle of 30 to 90° relative to a circumferential direction of a tire.

The heel area is defined as an area sandwiched between a first straight line extending radially inwardly in a perpendicular manner to a bottom surface of the bead portion from a cross section center of the bead core and a second straight line extending axially outwardly in a perpendicular manner to the first straight line from the cross section center of the bead core.

Effects of the Invention

In the heavy-load tire according to a first aspect of the invention, the reinforcing cord having a cord strength as high as 700 to 1,200 N is used for the bead reinforcing layer, and the reinforcing cord in the outer piece portion inclines at an angle of 40 to 70° relative to the circumferential direction of the tire, thereby increasing the effect of reinforcing. Such a structure increases flexural rigidity of the bead portion to thereby improve driving stability. However, the stress concentrated on the outer end of the outer piece portion increases, which causes a tendency that rubber separation at the outer end is promoted.

The stress concentration at the outer end can be reduced by the use of the bead apex rubber which has the inner apex portion having an L-shaped cross section. Specifically, in the bead apex rubber, the inner apex portion formed of a high complex elasticity modulus rubber has an L-shaped cross section including the bottom piece portion along the auxiliary turned-up portion and the raised piece portion along the body portion of the carcass ply. This secures the flexural rigidity of the bead portion and maintains the driving stability while making small the volume of the high complex elasticity modulus rubber. Furthermore, the rubber volume of the outer apex portion formed of a low complex elasticity modulus rubber can be increased in exchange for the reduction in the volume of the high complex elasticity modulus rubber. As a result, the shear distortion which acts on the outer piece portion of the bead reinforcing layer adjacent to the outer apex portion can be sufficiently eased. Thus, the rubber separation at the outer end of the outer piece portion can be effectively suppressed to thereby increase the bead durability.

According to the heavy-load tire of the second aspect of the invention, the heel cover layer which is composed of a cord ply in which an organic fiber cord is arranged at a predetermined angle is provided at the outer side of the heel area of the bead portion.

Here, in the wind bead structure, since the carcass ply is wound around the bead core, the cord tension of the carcass ply during driving is easily transmitted to the bead core as compared with a conventional tire having a non-wind bead structure. As a result, there is a tendency that the bead core is likely to move to the side of a rim flange under the effect of the cord tension and a high charging internal pressure. With the movement of the bead core, the movement of the body portion of the carcass ply also becomes large. As a result, the stress concentrating at the outer end of the outer piece portion of the bead reinforcing layer increases, and thus the rubber separation is promoted. Moreover, with the movement of the bead core, a chafer rubber (referred to as a clinch rubber) is sandwiched between the bead core and a rim to be compressed in the thickness direction. However, the chafer rubber extends in a direction perpendicular to the thickness direction. The extension causes distortion at the interface between the bead reinforcing layer and the chafer rubber, whereby rubber separation is induced.

However, the heel cover layer according to a second aspect of the invention is unified with the chafer rubber, thereby suppressing the extension of the chafer rubber in the direction perpendicular to the thickness direction. Therefore, the separation between the bead reinforcing layer and the chafer rubber can be suppressed. Moreover, as a result that the compression deformation of the chafer rubber in the thickness direction is suppressed by the suppression of the extension, the movement of the bead core toward the rim flange side is suppressed, whereby the movement of the body portion of the carcass ply is reduced. Furthermore, since the heel cover layer is unified with the chafer rubber to thereby improve the flexural rigidity, bead deformation can be suppressed, which is combined with the reduction in the movement of the body portion to suppress the rubber separation at the outer end of the outer piece portion.

BRIEF DESCRIPTION OF THE DRAWINGS

Hereinafter, an embodiment of the present invention will be described in conjunction with the drawings in which.

BEST MODE FOR CARRYING OUT THE INVENTION

Figure 10:
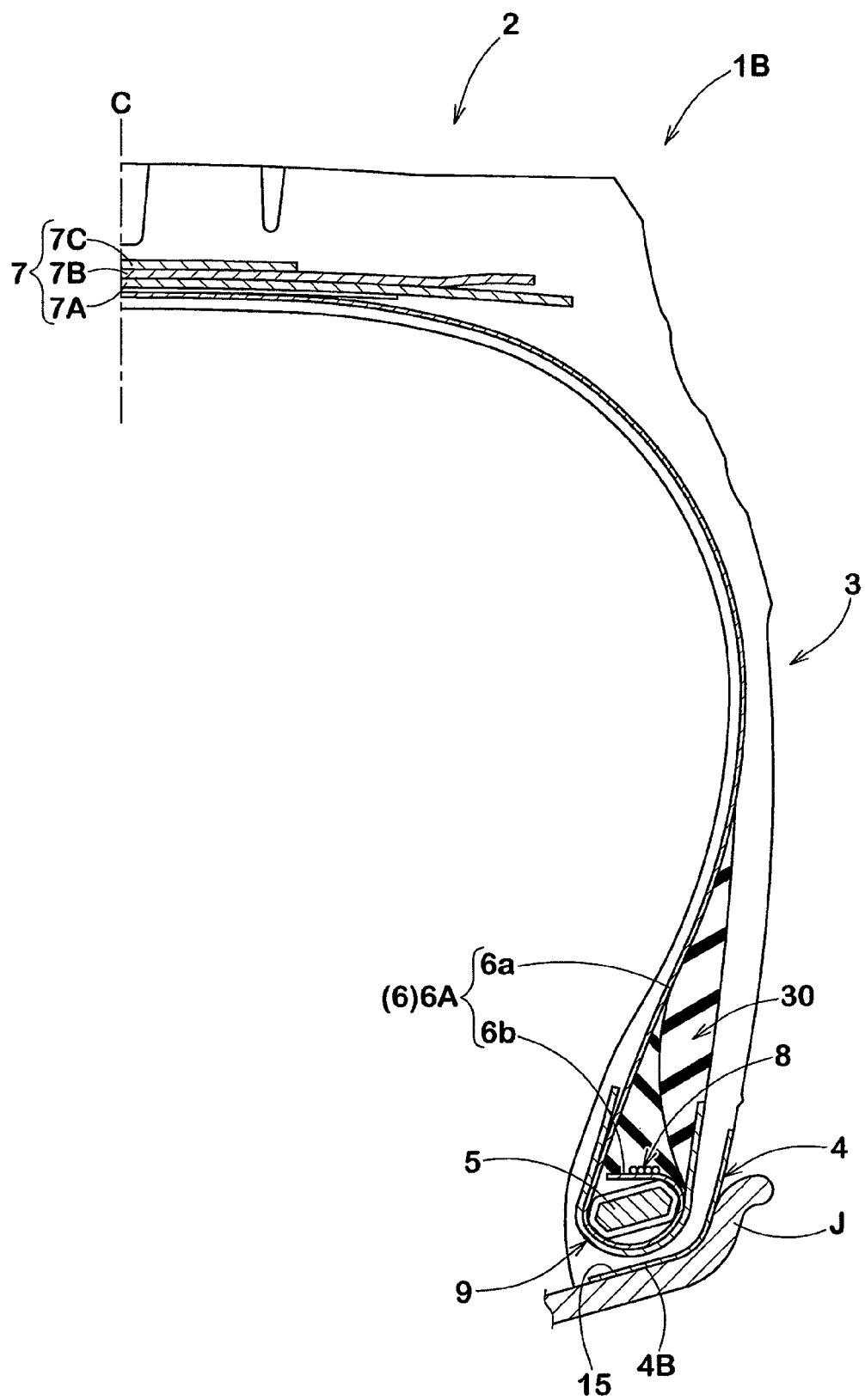
FIG. 10 is a cross sectional view illustrating an embodiment of a heavy-load tire according to a second aspect of the invention.
Figure 11:
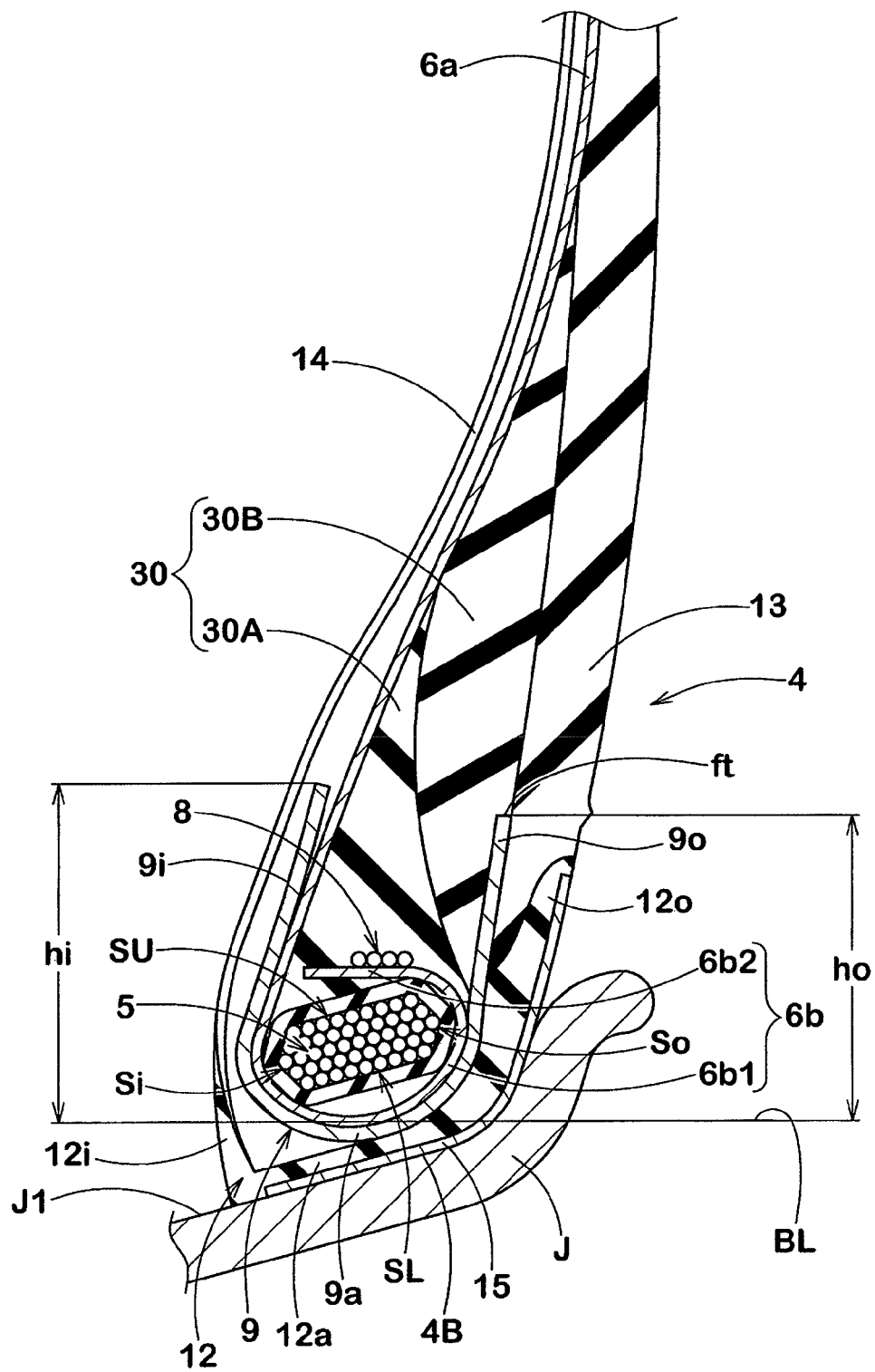
FIG. 11 is an enlarged cross sectional view illustrating a bead portion of the heavy-load tire according to the second aspect of the invention.

FIGS. 1 to 9 illustrate one embodiment of a heavy-load tire 1A according to a first aspect of the invention. FIGS. 10 and 11 illustrate one embodiment of a heavy-load tire 1B according to a second aspect of the invention.

Unless otherwise specified, the dimensions and the like of the parts of the tire are determined as those measured when the tire is mounted on a normal rim J and a normal pressure is charged, which is a no-load normal internal pressure condition. The term "standard rim", as used herein, refers to a rim specified as corresponding to the tire in a standard system encompassing the standard upon which the tire is based. For example, the standard rim is the "standard rim" specified in JATMA, "Design Rim" specified in TRA, or "Measuring Rim" specified in ETRTO. The term "standard pressure", as used herein, refers to an air pressure specified as corresponding to the tire in a standard system encompassing the standard upon which the tire is based. For example, the standard pressure is the maximum air pressure in JATMA, the maximum pressure given in the "TIRE LOAD LIMITS AT VARIOUS COLD INFLATION PRESSURES" table in TRA, or the "INFLATION PRESSURE" in ETRTO.

The heavy-load tire 1A is equipped with a carcass 6 in the shape of a toroid which extends from a tread portion 2 to a bead core 5 in a bead portion 4 through a sidewall portion 3 and a belt layer 7 which is disclosed at a radially outer side of the carcass 6 and the inner side of the tread portion 2.

The belt layer 7 is composed of at least two belt plies using belt cords each composed of steel cords. In this example, three belt plies 7A to 7C are provided. The belt cords of at least two belt plies among the belt plies 7A to 7C are disposed at a small angle (e.g., 10 to 35° relative to the circumferential direction of the tire and in such a manner that the plies cross each other. It should be noted that the belt layers 7 may be composed of four or more belt plies.

The carcass 6 is composed of a carcass ply 6A having a body portion 6a in the shape of a toroid which extends from the tread portion 2 to the bead core 5 in the bead portion 4 through the sidewall portion 3 and a turned-up portion 6b which extends from the body portion 6a and is turned up from an axially inner side to an axially outer side over the bead core 5. The carcass ply 6A has a carcass cord formed of a steel cord disposed at an angle of 80 to 90° relative to a tire equator C.

Figure 3:
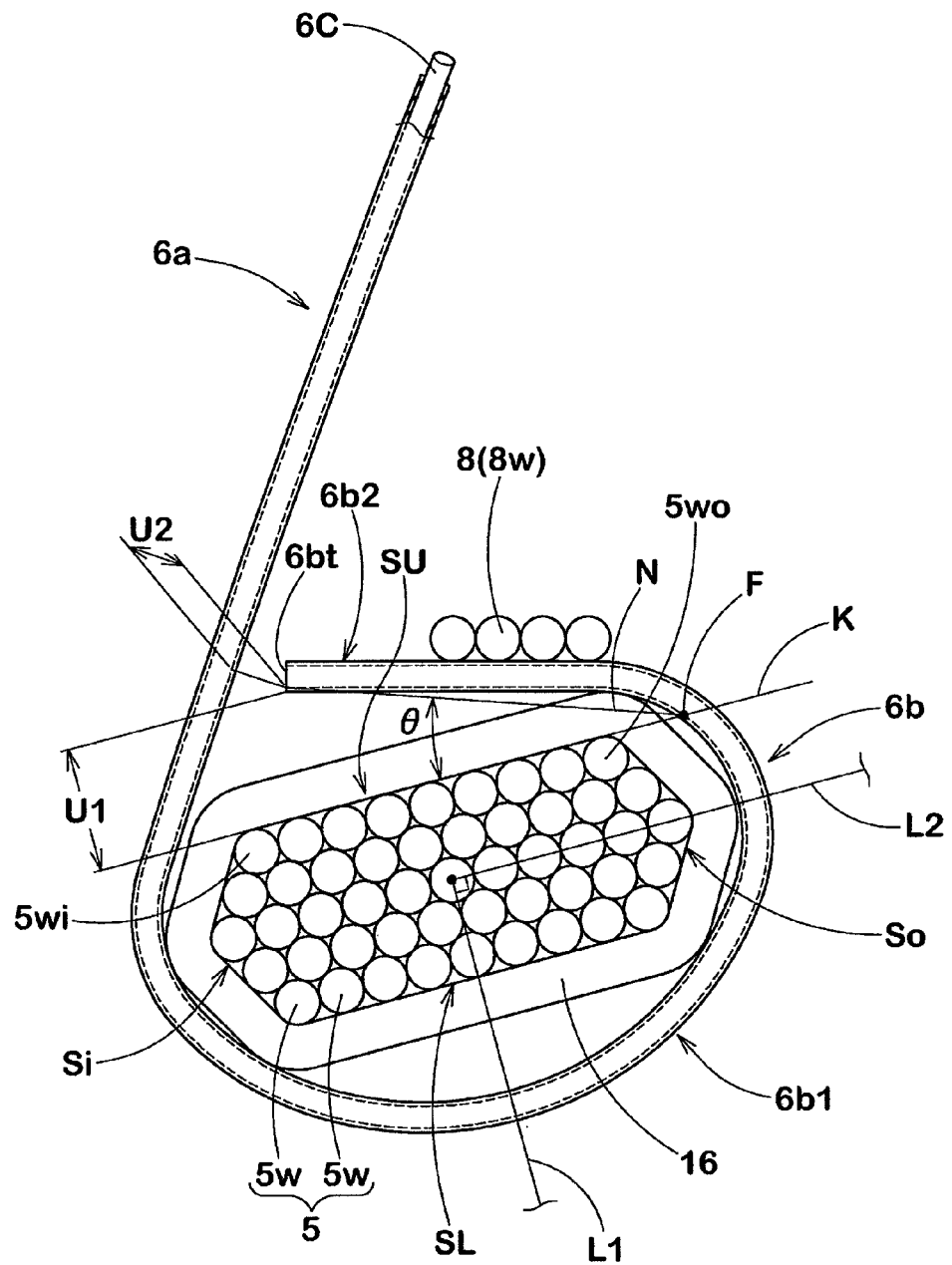
FIG. 3 is a further enlarged cross sectional view illustrating an essential portion of the bead portion.

The bead core 5 is a ring material which has an oblong flat hexagon-like cross section formed by winding a bead wire 5w formed of steel in such a manner as to form multiple layers and multiple rows as enlargedly illustrated in FIG. 3. Specifically, the bead core 5 has an inner side SL serving as a long side of the radially inner side in the hexagon-like cross section, an outer side SU serving as a long side of the radially outer side, an inner side Si having a chevron-shaped curved side which connects the inner side SL to the outer side SU at the axially inner side, and an outer side so serving as a curved side of the opposite side. The bead core 5 is surrounded by a so-called lapping rubber 16, which prevents direct contact with the carcass cord.

In this example, the radially inner side SL of the bead core 5 extends almost in parallel with a sheet surface J1 (illustrated in FIG. 1) of the rim J. Thereby, high fitting force between the bead portion 4 and the rim is obtained over a wide range. In this example, since the rim J is a 15° tapered rim, the radially inner side SL and the radially outer side SU of the bead core 5 are inclined at about 15° relative to an imaginary axial line.

Moreover, as illustrated in FIG. 3, the turned-up portion 6b of the carcass ply 6A has a so-called a wind bead structure composed of a main turned-up portion 6b1 which smoothly curves along an axially inner side Si, a radially inner side SL, and an axially outer side so of the bead core 5, and an auxiliary turned-up portion 6b2 which extends from the main turned-up portion 6b1 and extends toward the body portion 6a through the vicinity of the radially outer side SU of the bead core 5. As a preferable aspect, it is preferable that the turned-up portion 6b smoothly curve circularly without having an angled corner that is locally bent. It should be noted that when the turned-up portion 6b has an angled corner, there is a tendency that the strength of the carcass cord is reduced.

The auxiliary turned-up portion 6b2 is defined as a portion at a radially outer side relative to an extension K which is obtained by extending the radially outer side SU of the bead core 5. The auxiliary turned-up portion 6b2 extends and is inclined in a direction in which the distance from the extension K increases toward an outer end 6bt. The angle $\theta$ to the extension K of the auxiliary turned-up portion 6b2 is preferably 10° or more, and more preferably 15° or more. This suppresses the local bending of the carcass cord 6C. If the angle $\theta$ is too large, the suspension ability to the bead core 5 of the turned-up portion 6b becomes weak. This is likely to produce a phenomenon that the turned-up portion 6b is drawn to the body portion 6a side (a so-called a blow-by phenomenon). In view of the above respects, the angle $\theta$ is preferably 60° or less, more preferably 45° or less, and still more preferably 40° or less.

It should be noted that the angle $\theta$ is defined as an angle formed by the extension K and a straight line N, which connects a point F where the carcass cord 6c of the turned-up portion 6b crosses the extension K of the bead core 5 and the outer end 6bt of the turned-up portion 6b. Here, in some cases, the radially outer side SU of the bead core 5 becomes a non-flat surface due to, for example, variation in the positions of the bead wires 5w. In such a case, the extension K is approximated by a tangent which touches a bead wire 5wo disposed at an axially outermost side and a bead wire 5wi disposed at an axially innermost side among bead wire rows appearing at the radially outer side SU of the bead core 5.

Moreover, the shortest distance U1 between the outer end 6bt of the turned-up portion 6b and the extension K is preferably 2.0 mm or more, and more preferably 3.0 mm or more. If the distance U1 is less than 2.0 mm, the carcass cord needs to be sharply bent, which easily causes a reduction in the cord strength. If the distance U1 is excessively large, there is a tendency that the stress at the time of bending deformation of the bead portion 4 concentrates at the outer end 6bt, which is not preferable. In view of the respects, the distance U1 is preferably 8.0 mm or less, and more preferably 6.0 mm or less.

Moreover, in the carcass cord 6C, the outer end 6bt of the turned-up portion 6b terminates short of the body portion 6a instead of reaching the body portion 6a. The shortest distance U2 between the outer end 6bt and the body portion 6a is preferably 0.5 mm or more, and more preferably 1.0 mm or more. If the distance U2 is less than 0.5 mm, friction may occur between the outer end 6bt and the body portion 6a, which may cause fretting breakage depending on how the bead portion 4f is deformed. In contrast, if the distance U2 is excessively large, the suspension ability of the turned-up portion 6b to the bead core 5 is likely to become insufficient, and thus the above-mentioned blow-by phenomenon easily arises. In view of the respects, the distance U2 is preferably 5.0 mm or less, and more preferably 4.0 mm or less.

Furthermore, in the heavy-load tire 1A, in order to prevent spring back of the auxiliary turned-up portion 6b2, an auxiliary cord layer 8 is provided radially outwardly relative to the auxiliary turned-up portion b2. This auxiliary cord layer 8 is formed of a ring-shaped material in which an auxiliary cord 8w formed of, for example, steel cord, is spirally wound in the circumferential direction of the tire at least once, preferably two or more times. Thus, the spring back can be reliably suppressed without excessively molding the carcass load 6c. Therefore, the auxiliary turned-up portion 6b2 can be stably maintained in an intended form while preventing a sharp reduction in the strength of the carcass cord resulting from molding.

As the auxiliary cord 8w, a steel cord whose cord strength is 2000 to 4000 N is preferable. If the cord strength is less than 2000 N, there is a tendency that the holding effect for the auxiliary turned up portion b2 becomes insufficient. If the cord strength exceeds 4000 N, there is a tendency that the auxiliary cord 8w is stiffened, which makes it difficult to wind the cord.

Figure 1:
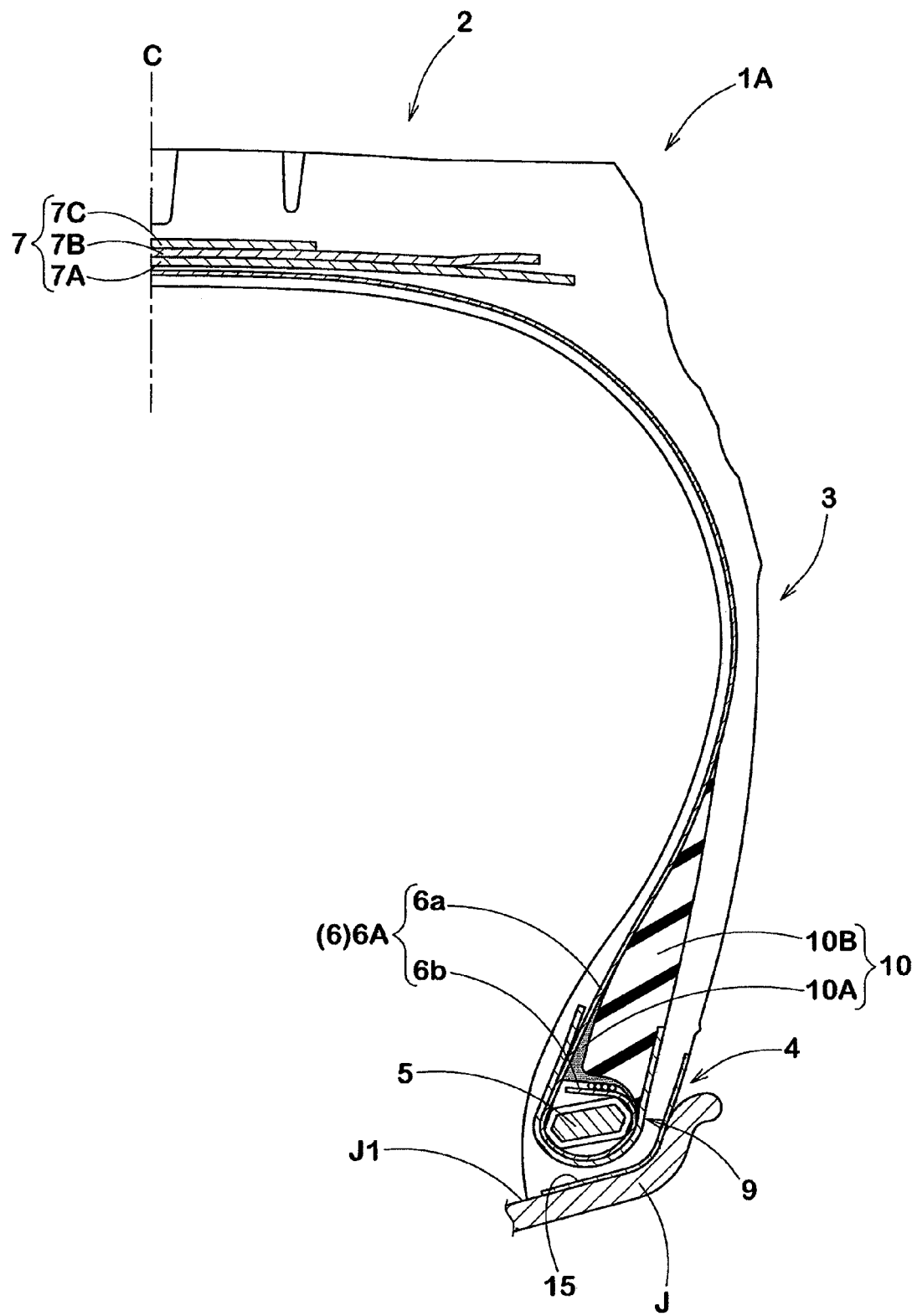
FIG. 1 is a cross sectional view illustrating an embodiment of a heavy-load tire according to a first aspect of the present invention.
Figure 2:
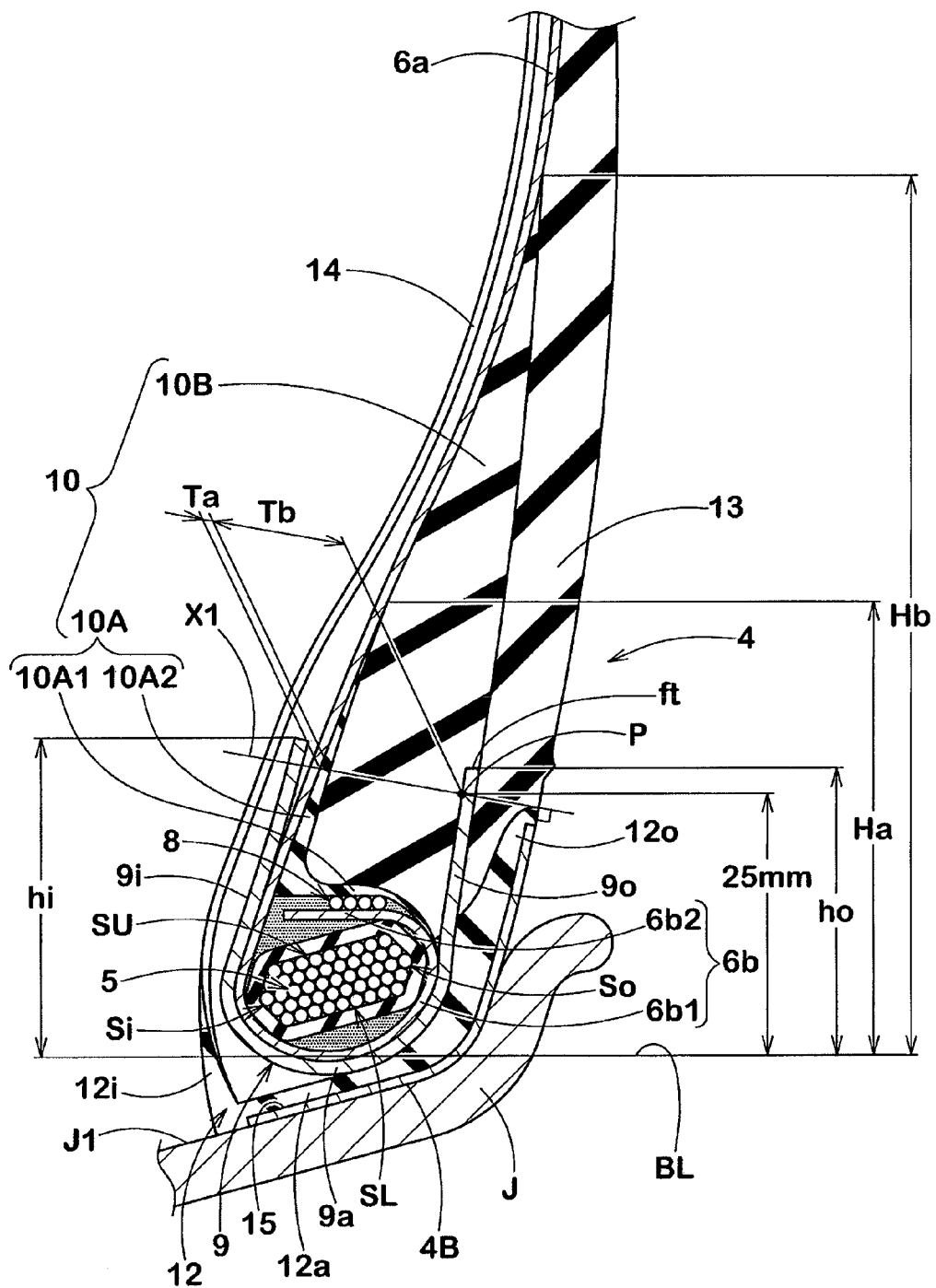
FIG. 2 is an enlarged cross sectional view illustrating a bead portion of the heavy-load tire according to the first aspect of the present invention.

Moreover, as illustrated in FIGS. 1 and 2, the bead portion 4 is provided with a bead reinforcing layer 9 having a u-shaped cross-section and a bead apex rubber 10 having a substantially triangular-shaped cross-section disposed radially outwardly relative to the auxiliary turned-up portion b2.

As shown in FIG. 2, the bead reinforcing layer 9 is composed of an intermediate portion 9a circularly extending farther radially inwardly than the main turned-up portion 6b1 and along the main turned-up portion 6b1, an outer piece portion 9o which extends from the axially outer side of the intermediate portion 9a and radially outwardly extends away from the main turned-up portion 6b1, along an axially outer side of the bead apex rubber 10 and an inner piece portion 9i which extends from the axially inner side of the intermediate portion 9a and extends radially outwardly along the axially inner side of the body portion 6a of the carcass ply 6A. The bead reinforcing layer 9 is formed of one ply in which the reinforcing cords 9C each formed of steel cord are arranged.

With the wind bead structure, since the turned-up portion 6b of the carcass ply 6A is wound around the bead core 5, the flexural rigidity of the bead portion 4 becomes insufficient as compared with a conventional tire of a non-wind bead structure, in which the turned-up portion extends radially outwardly along the outer side of the bead apex rubber. Moreover, during vulcanization, rubber including a bead apex rubber and the like is likely to axially outwardly flow non-uniformly and broadly. As a result, there is a tendency that variation in a rubber gage arises such as reduction in thickness of the rubber gage of the bead portion.

Therefore, the bead portion 4 is provided with the bead reinforcing layer 9 having a u-shaped cross section including the outer piece portion 9o and the inner piece portion 9i. This improves the flexural rigidity of the bead portion 4, thereby securing driving stability comparable to that of a conventional tire having a non-wind bead structure. Further, the outer piece portion 9o suppresses a rubber flow at the bead portion during vulcanization and thus stabilizes the rubber gage of the bead portion, thereby preventing the variation in the rubber gage.

Here, the cord strength of the reinforcing cord 9C of the bead reinforcing layer 9 is at least 700 N or higher, preferably 800 N or higher, and more preferably 850 N or higher. If the cord strength is less than 700 N, there is a possibility that the reinforcing cord 9C may be susceptible to fracture and plastic deformation due to deformation of the bead portion 4 during driving and also there is a possibility that the cord is likely to deform by a pressure applied from a bladder during vulcanization. In contrast, if the cord strength becomes excessively large, there is a possibility that molding to obtain a u shape cross section becomes difficult to carry out, which incurs a sharp increase in manufacturing cost. In view of the respects, the cord strength of the reinforcing cord is at least 1200 N or less, preferably 1100 N or lower, and more preferably 1000 N or lower. It should be noted that the cord strength of the auxiliary cord 8w is higher than the cord strength of the reinforcing cord 9C.

Figure 4:
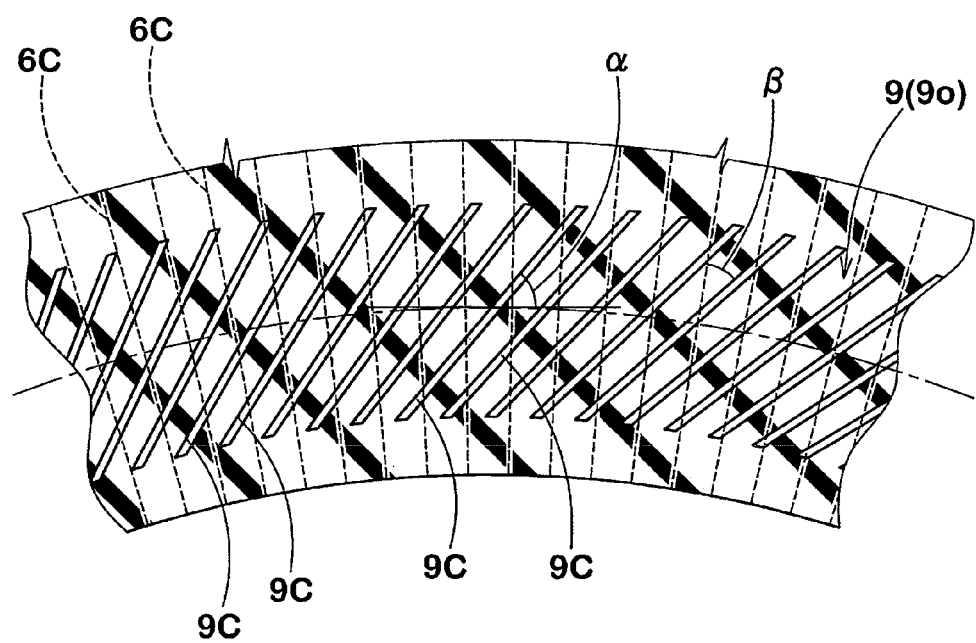
FIG. 4 is a side cross sectional view of the bead portion illustrating the arrangement of reinforcing cords in an outer piece portion of a bead reinforcing layer.

FIG. 4 is a side cross sectional view of the bead surface in which the rubber at the outer side of the bead portion 4 is removed so that the outer piece portion 9o of the bead reinforcing layer 9 can be seen from the axially outer side. In the outer piece portion 9o, the reinforcing cord 9C of the bead reinforcing layer 9 is disposed inclining at an angle α of 40 to 70° relative to the circumferential direction of the tire. If the angle α is less than 40°, the reinforcing cord 9C of the bead reinforcing layer 9 does not exhibit sufficient resistance against tilt of the bead portion 4 toward the axially outer side or the pressure during vulcanization. In contrast, if the angle α exceeds 70°, the angular difference β between the reinforcing cord 9C of the bead reinforcing layer 9 and the carcass cord 6C of the body portion 6a of the carcass ply 6A becomes small, which causes a tendency that a sufficient effect of reinforcing cannot be achieved. In view of the respects, the lower limit of the angle α is preferably 45° or more relative to the circumferential direction of the tire, and the upper limit thereof is preferably 65° or lower, and more preferably 60° or more.

Moreover, in order to improve the flexural rigidity of the bead portion 4 more effectively with the bead reinforcing layer 9, it is preferable that each of the height hi and ho from a bead base line BL of the outer piece portion 9o and the inner piece portion 9i is 15 mm or more, and preferably 20 or more, as illustrated in FIG. 2. In contrast, if each of the height ho and the height hi is excessively large, the tire weight is increased and the durability is degraded due to that the outer end ft of the outer piece portion 9o comes closer to the sidewall portion 3 which sharply bends during driving. In view of the respects, each of the height ho and the height hi is preferably 40 mm or lower, and more preferably 35 mm or lower.

In particular, hi>ho is preferable. Thereby, the stress concentration at the outer end ft of the outer piece portion 9o during driving is reduced. In view of the respects, the difference between the heights (hi-ho) is preferably 2 mm or more. Since the inner piece portion 9i is disposed adjacent to the body portion 6a, the stress which acts on the outer end is small as compared with the outer piece portion 9o. Thus, breakage at the outer end of the inner piece portion 9i is less likely to occur.

Next, the bead apex rubber 10 is composed of an inner apex portion 10A which is formed of a high complex elasticity modulus rubber and disposed radially inwardly and an outer apex portion 10B which is formed of a rubber whose complex elasticity modulus is lower than that of the rubber of the inner apex portion 10A and disposed radially outwardly. Moreover, the inner apex portion 10A has an L-shaped cross section including a bottom piece portion 10A1 along the radially outer side of the auxiliary turned-up portion 6b2 and a raised piece portion 10A2 which rises at the end of the radially inner side of the bottom piece portion 10A1 and extends radially outwardly in a tapering manner along the body portion of the carcass ply 6A.

Thus, the inner apex portion 10A formed of a high complex elasticity modulus rubber has an L-shaped cross section including the raised piece portion 10A2 and the bottom piece portion 10A1 and the raised piece portion 10A2 radially extends along the outer side of the body portion 6a of the carcass ply. As a result, high flexural rigidity is demonstrated against the tilt of the body portion 6a of the carcass ply 6A toward the rim flange side, which cooperates with the bead reinforcing layer 9 to maintain the driving stability, and moreover, improve the driving stability. Moreover, since the inner apex portion 10A has an L-shaped cross section, the rubber volume of the outer apex portion 10B formed of a low complex elasticity modulus rubber can be increased in exchange for a reduction in the rubber volume of the high complex elasticity modulus rubber. This s sufficiently alleviates the shear distortion which acts on the outer end portion of the outer piece portion 9o of the bead reinforcing layer 9, which prevents the rubber separation at the outer end ft of the outer piece portion 9o to thereby improve the bead durability. It should be noted that since the high complex elasticity modulus rubber has relatively high energy loss, the heavy-load tire 1A can reduce rolling resistance. Furthermore, since the thickness of the raised piece portion 10A2 gradually decreases radially outwardly, the difference in rigidity between the inner apex portion 10A and the outer apex portion 10B is reduced. This leads to prevention of breakage arising at the radially outer end of the raised piece portion 10A2 and the like.

A high complex elasticity modulus rubber having a complex modulus of elasticity $E*1$ of 20 to 70 MPa is preferably used for the inner apex portion 10A. If the complex modulus of elasticity E*1 is less than 20 MPa, the effect of reinforcing the flexural rigidity of the bead portion 4 relatively decreases. In contrast, if the complex modulus of elasticity E*1 exceeds 70 MPa, the ability to alleviate distortion is lowered, and the flexural rigidity of the bead portion 4 excessively increases, which causes a possibility of considerably degrading comfortable ride. In particular, the lower limit of the complex modulus of elasticity E*1 of the inner apex portion 10A is preferably 35 MPa or more and the upper limit thereof is preferably 60 MPa or less. For the outer apex portion 10B, a low complex elasticity modulus rubber whose complex modulus of elasticity E*2 is 2.0 to 6.0 MPa is preferably used. If the complex modulus of elasticity E*2 is less than 2.0 MPa, the effect of reinforcing the bead portion 4 becomes insufficient. In contrast, when the complex modulus of elasticity E*2 exceeds 6.0 MPa, the ability to alleviate distortion becomes insufficient.

The complex moduli of elasticity E*1 and the complex modulus of elasticity E*2 refer to values measured at a temperature of 70° C., at a frequency of 10 Hz, at an initial distortion of 10%, and at an amplitude of 2% using a viscoelasticity spectrometer manufactured by IWAMOTO SEISAKUCHO CO., LTD.

Moreover, the height Hb of the outer apex portion 10B (i.e., radial height from the bead base line BL to the radial outer end of the outer apex portion 10B) is preferably 40 to 100 mm. The height Ha of the raised piece portion 10A2 (i.e., radial height from the bead base line BL to the radially outer end of the raised piece portion 10A2) is not less than 35 mm and less than the height Hb.

If the height Hb is less than 40 mm or the height Ha is less than 35 mm, the flexural rigidity of the bead portion 4 cannot be sufficiently improved, and thus there is a possibility that the driving stability may be lowered. In contrast, if the height Hb exceeds 100 mm or f the height Ha is equal to or more than the height Hb, the bead apex rubber 10 is unnecessarily enlarged, resulting in an increase in tire weight. Moreover, the outer end of the inner apex portion 10A and the outer apex portion 10B are aligned to each other, whereby distortion concentrates there, resulting in that breakage is likely to occur. In order to improve the flexural rigidity of the bead portion 4 more effectively without degrading the durability, the height Ha of the outer end of the inner apex portion 10A is preferably larger than the height hi of the inner piece portion 9i of the bead reinforcing layer 9.

Furthermore, the thickness of the raised piece portion 10A2 gradually decreases radially outwardly. It is preferable that the thickness Ta of the raised piece portion 10A2 is adjusted to 1.0 to 4.0 mm and the thickness Tb of the outer apex portion 10B is adjusted to 7.0 to 13.0 mm on the base line X1 defined below. The base line X1 is defined as a line orthogonal to the outer side of the tire through the point P which is disposed at the axially outer side of the bead apex rubber 10 and which has a distance of 25 mm from the bead base line BL toward the radially outer side. As shown in FIG. 2, the outer piece portion 9o of the bead reinforcing layer 9 contacts the point P, and both the outer piece portion 9o and the inner piece portion 9i of the bead reinforcing layer 9 extend radially outward from the base line X1.

The height position having a distance of 25 mm from the bead base line BL is near the radially outermost position in a region in which the tire outer side is in contact with the rim fringe when a normal (standard) load is applied to the tire in a condition of a normal inner pressure, and, at the position, a large distortion is likely to occur. Therefore, the durability of the bead portion 4 can be more effectively increased by specifying the thicknesses Ta and Tb of such a height position.

If the thickness Ta of the raised piece portion 10A2 is less than 1.0 mm, the flexural rigidity of the bead portion 4 is lowered and the driving stability is lowered. In contrast, if the thickness Ta exceeds 4.0 mm, the rubber volume of the outer apex portion 10B decreases, and thus the ability to alleviate distortion becomes insufficient. In view of the respects, the lower limit of the thickness Ta of the raised piece portion 10A2 is preferably 1.5 mm or more and the upper limit thereof is preferably 3.0 mm or lower.

Moreover, if the thickness Tb of the outer apex portion 10B is less than 7.0 mm, the ability to reduce the deformation or distortion of the outer piece portion 9o of the bead reinforcing layer 9 cannot be sufficiently demonstrated. In contrast, if the thickness Tb exceeds 13.0 mm, the bead apex rubber 10 is enlarged, which causes an increase in weight and cost. In view of the respects, the lower limit of the thickness Tb of the outer apex portion 10B is more preferably 10.0 mm or more and the upper limit thereof is more preferably 12.0 mm or lower.

In particular, the lower limit of the ratio of the thickness Ta to the thickness Tb (Ta/Tb) is 0.10 or more, and more preferably 0.15 or more, and the upper limit thereof is 0.35 or lower, and more preferably 0.25 or lower. This enables to improve the flexural rigidity of the bead portion 4 and the ability to alleviate distortion in a well balanced manner.

Figure 5:
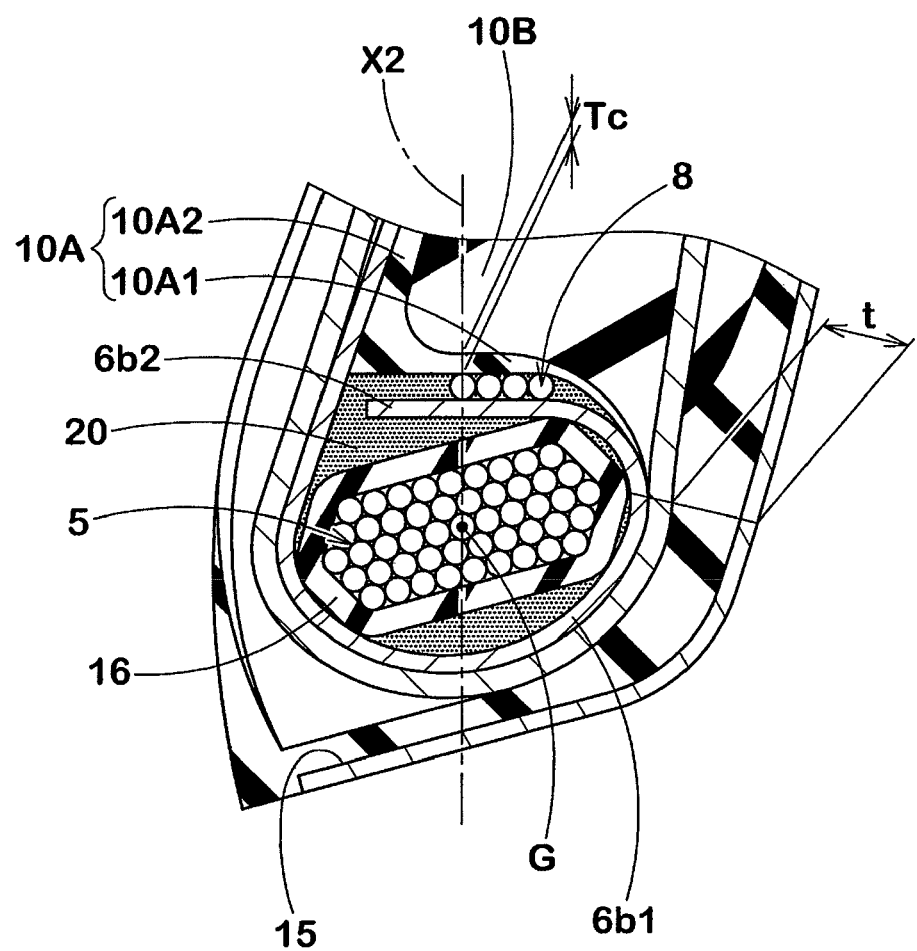
FIG. 5 is a cross sectional view illustrating an inner apex portion.

Moreover, by covering the auxiliary turned-up portion b2, the bottom piece portion 10A1 formed of a high complex elasticity modulus rubber effectively prevents, with the auxiliary cord layer 8, the spring back of the auxiliary turned up portion b2, and can prevent breakage at the outer end. In view of the respects, with respect to the bottom piece portion 10A1, the thickness Tc on an imaginary radial line X2 passing through the cross section center G of the bead core 5 as illustrated in FIG. 5 is adjusted to at least 1.0 mm or more, preferably 2.0 mm or more, and more preferably 2.5 mm or more. In contrast, if the thickness Tc of the bottom piece portion 10A1 is excessively large, the rubber volume of the outer apex portion 10B decreases. Therefore, the upper limit thereof is 10.0 m or lower, preferably 7.0 mm or lower, and more preferably 5.0 mm or lower.

A cushion rubber 20 is provided between the inner apex portion 10A and the bead cores 5 and between the bead core 5 and the main turned-up portion 6b1. For the cushion rubber 20, it is preferable to use a low complex elasticity modulus rubber whose complex modulus of elasticity is lower than that of the inner apex portion 10A. For example, a rubber whose complex modulus of elasticity is about 5.0 to 10.0 MPa is preferable. This prevents direct contact between the outer end 6bt of the auxiliary turned-up portion 6b2 and the high complex elasticity modulus inner apex portion 10A, and thus, effectively alleviates the distortion which acts on the outer end 6bt.

Next, as enlargedly illustrated in FIG. 2, the bead portion 4 is provided with a chafer rubber 12. The chafer rubber 12 is composed of a base portion 12a which extends along a sheet surface J1 of the rim J through the radially inner side of the intermediate portion 9a of the bead reinforcing layer 9, an inner raised portion 12i which extends radially outwardly from the end portion at the toe side of the base portion 12a, and an outer raised portion 12o which extends radially outwardly along the outer piece portion 9o of the bead reinforcing layer 9 from the end portion at the heel side of the base portion 12a. The base portion 12a and the outer raised portion 12o are arranged in such a manner as to be in contact with the bead reinforcing layer 9. Moreover, the outer raised portion 12o extends radially outwardly beyond the outer end of the flange of the rim J. Such a chafer rubber 12 needs a sufficient wear-resistant property and hardness. Thus, such a hard rubber material is used as to have a JISA hardness of preferably 60°, and more preferably 70° or more.

A sidewall rubber 13 softer than the chafer rubber 12 is connected to the radially outer side of the outer raised portion 12o of the chafer rubber 12, and an inner liner rubber 14 to be provided to the inside of the body portion 6a is connected to the inner raised portion 12i of the chafer rubber 12.

Figure 6:
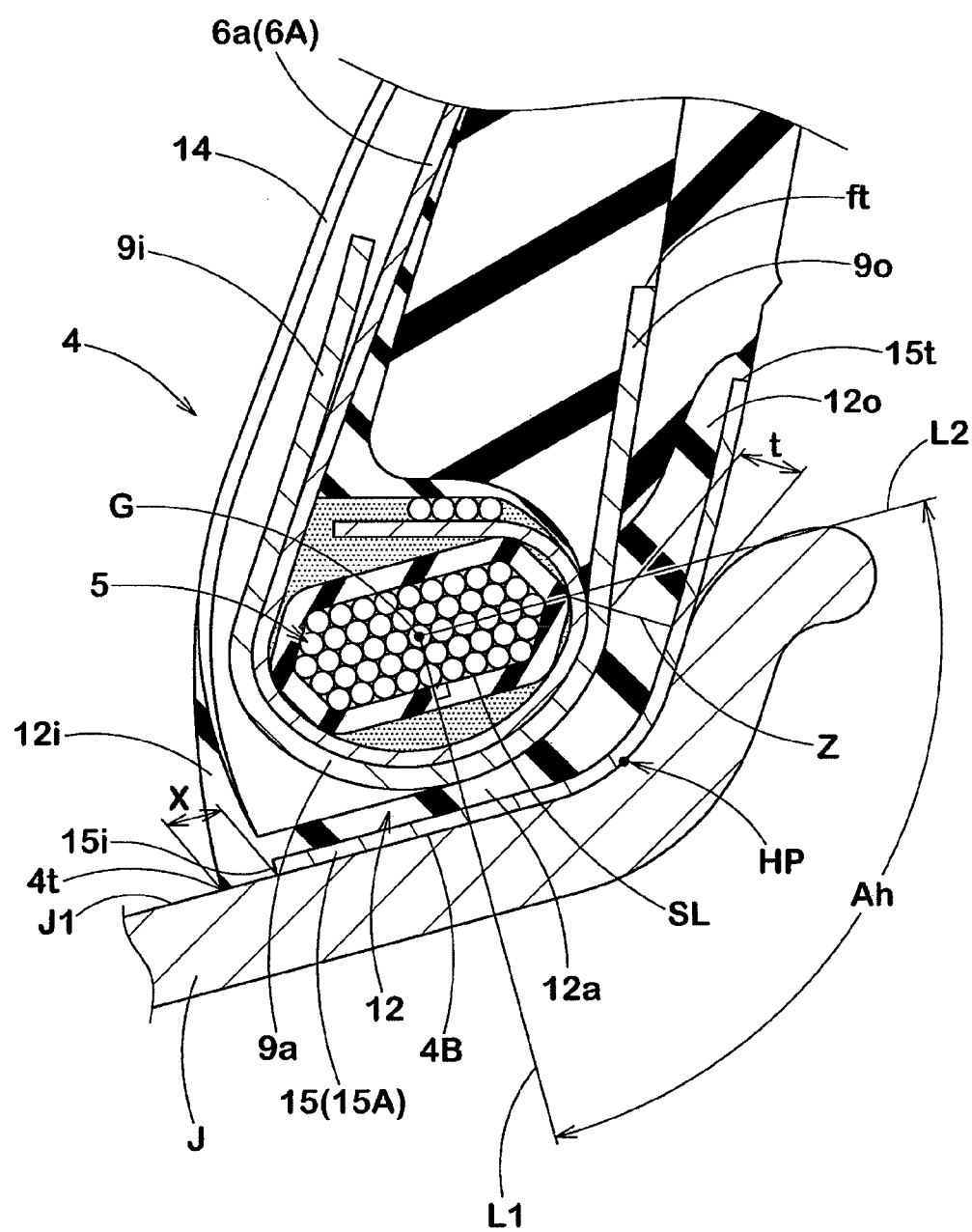
FIG. 6 is a cross sectional view illustrating a heel cover layer.

Next, as illustrated in FIG. 6, the bead portion 4 is provided with a heel cover layer 15 composed of at least one cord ply 15A having an organic fiber cord at least one portion of the outer side of a heel area Ah defined below. The heel area Ah is defined as an area sandwiched between a first straight line L1 which extends radially inwardly in a direction perpendicular to the bottom surface 4B of the bead portion 4 from the cross section center G of the bead core 5 and a second straight line L2 which extends axially outwardly in a direction perpendicular to the first straight line L1 from the cross section center G of the bead core 5. It should be that the bottom surface 4B of the bead portion 4 refers to a portion in contact with a linear sheet surface 31 of the rim J.

In this example, the heel cover layer 15 is disposed including the entire outer side of the heel area Ah. The heel cover layer 15 continuously extends in the circumferential direction of the tire, and covers the outer sides of the base portion 12a of the chafer rubber 12 and the outer raised portion 12o.

With the wind bead structure, when a tensile force is applied to the body portion 6a of the carcass ply 6A during driving, a radially outward force and a moment around the cross section center G of the bead core 5 are strongly applied to the bead core 5. Thus, the bead core 5 is likely to move to the rim flange side. In accordance with such movement of the bead core 5, the movement of the body portion 6a also becomes large. As a result, stress concentrated at the outer end ft of the outer piece portion 9o of the bead reinforcing layer 9 increases to thereby promote rubber separation. Moreover, with the movement of the bead core 5, the chafer rubber 12 particularly in the heel area Ah is sandwiched between the bead core 5 and the rim J to be compressed in the thickness direction, while causing extension in a direction perpendicular to the thickness direction. The extension causes distortion occurring at the interface between the bead reinforcing layer 9 and the chafer rubber 12, which induces rubber separation.

In contrast, the heel cover layer 15 is unified with the base portion 12a and the outer raised portion 12o of the chafer rubber 12. Therefore, the extension of the chafer rubber 12 in a direction perpendicular to the thickness direction can be suppressed. This suppresses separation between the bead reinforcing layer 9 and the chafer rubber 12. Moreover, as a result that the compression deformation of the chafer rubber 12 in the thickness direction is suppressed by the suppression of the extension, the movement of the bead core 5 toward the rim flange is suppressed, whereby the movement of the body portion 6a of the carcass ply 6 is reduced. Furthermore, since the heel cover layer 15 is unified with the chafer rubber to thereby improve the flexural rigidity, bead deformation can also be suppressed, which combines with the reduction in the movement of the body portion 6a to suppress the rubber separation at the outer end ft of the outer piece portion 9o.

Such a heel cover layer 15 is formed of at least one cord ply 15A in which organic fiber cords are arranged. A steel cord shows low adhesion properties with rubber and does not provide sufficient ductility. Therefore, if the steel cord is used as a cord ply of the heel cover layer 15, another breakage starting at the heel cover layer 15 arises. Thus, the steel cord is not preferable. As the organic fiber cord, for example, nylon, rayon, polyester, or aramid is preferably used. Moreover, as the heel cover layer 15, an organic fiber cord having a thickness of 1800 to 2200 dtex is preferable, and a ply obtained by driving 20 to 30 cords per 5 cm is particularly preferable.

Figure 7:
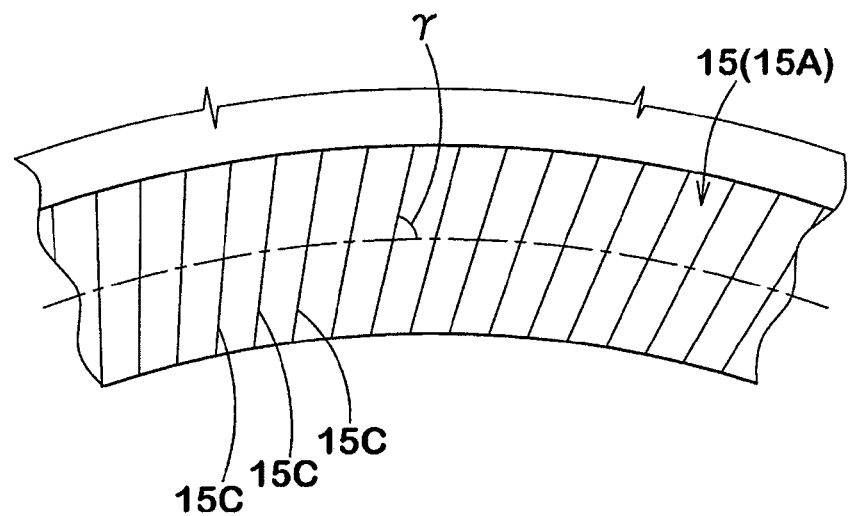
FIG. 7 is a partial side view of the bead portion illustrating the arrangement of organic fiber cords of the heel cover layer.
Figure 8:
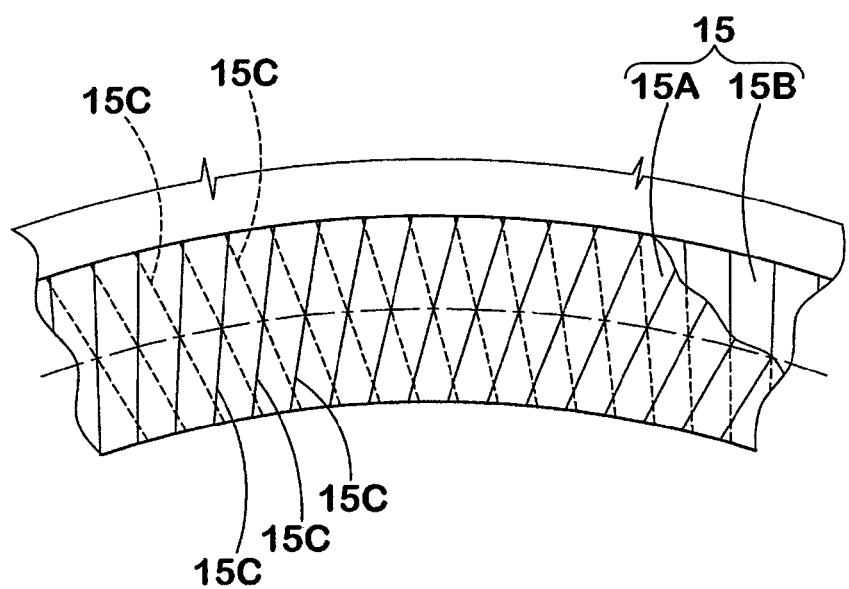
FIG. 8 is a partial side view of the bead portion illustrating another arrangement of the organic fiber cords of the heel cover layer.

FIG. 7 is a side view of the bead portion 4 as viewed from the axially outer side. Organic fiber cords 15c of the heel cover layer 15 are arranged at an angle $\gamma$ of 30 to 90° relative to the circumferential direction of the tire. If the angle $\gamma$ is less than 30°, opening between the cords 15C is likely to occur, making it impossible to effectively suppress the extension in the radial direction of the chafer rubber 12. In view of the respects, the angle $\gamma$ is preferably 40 to 90°, and more preferably 45 to 90°. In order to, in particular, increase the protective effect of the chafer rubber 12, it is preferable that the heel cover layer 15 be composed of two cord plies 15A and 15B which are superimposed in such a manner that the organic fiber cords 15C cross each other as illustrated in FIG. 8.

The heel cover layer 15 may be provided at a portion of the heel area Ah. In this case, it is preferable that the heel cover layer 15 be disposed to occupy at least 50% or more, more preferably 60% or more, and still more preferably 80% or more of the heel area Ah. In particular, it is preferable that the heel cover layer 15 be disposed throughout the heel area Ah as in this example. This more reliably improves the durability of the bead portion 4.

Moreover, in this example, a radially inner end 15i of the heel cover layer 15 terminates short of the toe end 4t of the bead portion 4. Thus, the toe side of the bottom surface 4B of the bead portion 4 can have its rubber portion brought into contact with the rim. This increases the ability to maintain the internal pressure and also effectively alleviates the impact during driving with the thick rubber portion at the toe side, which helps prevent the development of oscillation. In order to effectively demonstrate such an effect, the distance X along the sheet surface J1 between the inner end 15i of the heel cover layer 15 and the toe end 4t is 5 mm or more, and preferably in the range of 10 to 20 mm.

Figure 9:
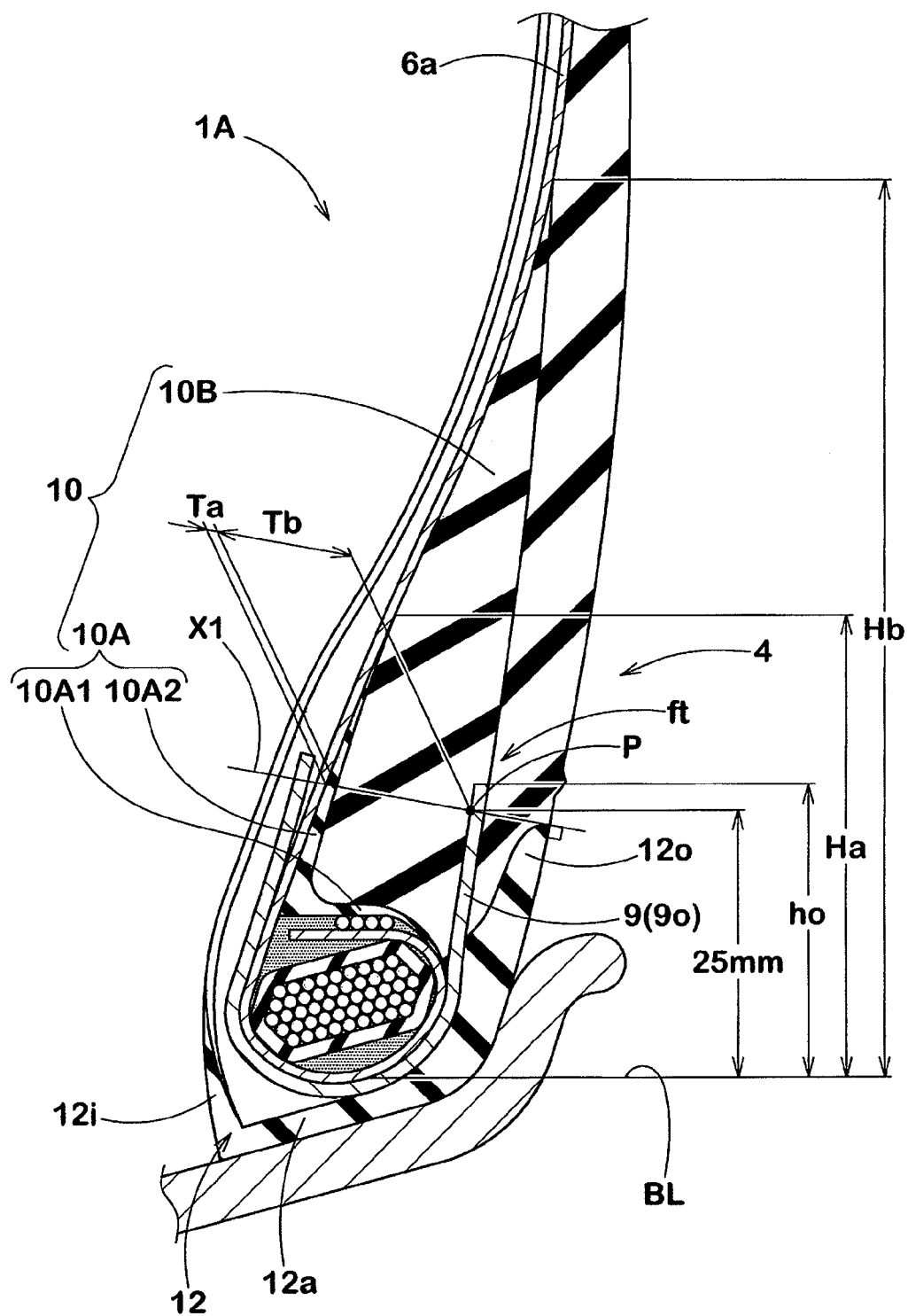
FIG. 9 is a cross sectional view illustrating another example of the bead portion of the heavy-load tire according to the first aspect of the invention.

FIG. 9 illustrates another example of the heavy-load tire 1A according to the first aspect of the invention. The heavy-load tire 1A of FIG. 9 is substantially the same in the structure as the above-described tire 1A except that the heel cover layer 15 is not provided. In this case, the above-described effects provided by the heel cover layer 15 cannot be expected. However, the bead apex rubber 10 having the inner apex portion 10A having an L-shaped cross section sufficiently secures the flexural rigidity of the bead portion and also can alleviate the shear distortion which acts on the outer piece portion 9o of the bead reinforcing layer 9. As a result, the rubber separation at the outer end ft of the outer piece portion 9o is suppressed to thereby improve the bead durability while maintaining or improving driving stability.

Next, FIGS. 10 and 11 illustrate an example of a heavy-load tire 1B according to a second aspect of the invention. The heavy-load tire 1B of FIG. 10 or 11 is substantially the same in the structure as the above-described tire 1A except that a conventional bead apex rubber 30 is provided in place of the bead apex rubber 10 having the inner apex portion 10A having an L-shaped cross section. In this case, although the above-described effects provided by the bead apex rubber 10 cannot be expected, the above-described effects provided by the heel cover layer 15 are demonstrated. Therefore, separation between the bead reinforcing layer 9 and the chafer rubber 12 is suppressed, and also the shear distortion at the outer end ft of the outer piece portion 9o is alleviated to thereby suppress rubber separation, whereby bead durability is improved.

The bead apex rubber 30 is composed of an inner apex portion 30A which is formed of a high complex elasticity modulus rubber and is disposed at the radially inner side and an outer apex portion 30B which is formed of a rubber whose complex elasticity modulus is lower than that of the rubber of the apex portion 30A and is disposed at the radially outer side. The inner apex portion 30A is formed to have a triangular-shaped cross-section which rises from the radially outer side of the auxiliary turned-up portion 6b2.

While description has been made of one particularly preferable embodiment of the present invention, the illustrated embodiment should not be construed as to limit the scope of the present invention; various modifications are possible without departing from the scope of the present invention.

[Test A]

Figure 12:
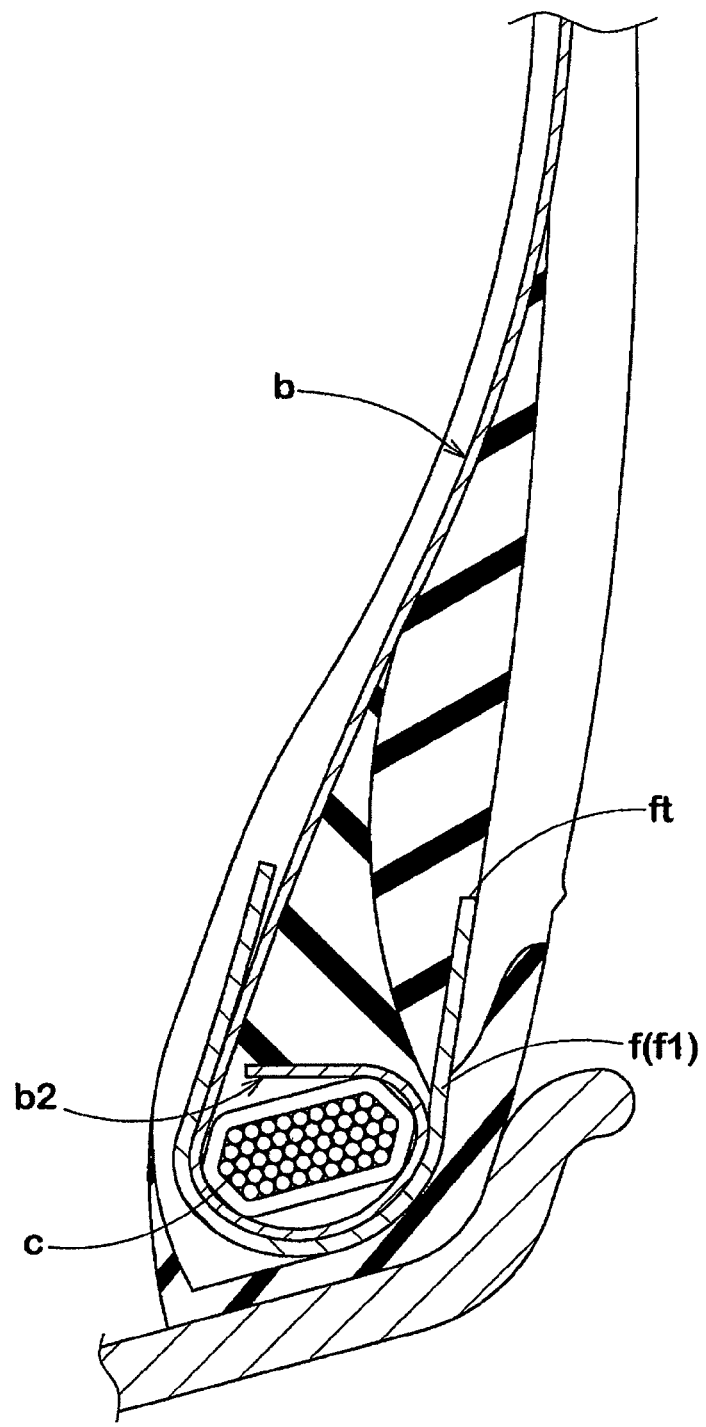
FIG. 12 is a partial cross sectional view of a conventional bead portion.

Experimental heavy-load tires (size: 11R22.5) having the basic structure of FIG. 9 and the specifications shown in Tables 1 and 2 were prepared, and were tested for the following performances. Each tire has the same specifications other than those shown in Tables 1 and 2. In each tire, the complex modulus of elasticity $E^*1$ of the inner apex portion was 50.0 MPa and the complex modulus of elasticity $E^*2$ of an outer apex portion was 4.0 MPa. It should be noted that Comparative Example A1 is equipped with a bead apex rubber illustrated in FIG. 12. The test method is as follows.

<Bead Durability>

A test tire was made to drive at a velocity of 20 km/h on a drum tester under the conditions: a rim of 7.50×22.5, an internal pressure of 700 kPa, and a longitudinal load of 3 times higher than 27.25 kN. The driving time taken before damage occurred in the bead portion was measured. Evaluation is expressed as an index in which the driving time of comparative Example A1 is defined as 100. When the index is larger, the bead durability is more excellent.

<Change in Thickness of Chafer Rubber>

Before and after the above-described bead durability test, the thickness t (denoted by a reference character t in FIG. 6) of a chafer rubber on the normal z drawn from the middle position of the height of the outer side of the bead core to the outer side of the bead portion was measured. Then the reduction of the thickness was calculated. It can be said that when the reduction is smaller, the durability of the bead portion is higher.

<Bead Durability After Deterioration>

A tire was attached to the rim, charged with an internal pressure (1050 kPa), and stored in an oven with a temperature of 80° C. for one week. Thereafter, the internal pressure was adjusted to 700 kPa to carry out the same bead durability test as the above. Evaluation is expressed as an index in which the driving time of comparative Example A1 is defined as 100. When the index is larger, the bead durability is more excellent.

<Driving Stability>

Using a tire static tester, the ratio: the transverse load/the amount of horizontal deflection under the conditions: a rim of 7.50×22.5, an internal pressure of 800 kPa, a longitudinal load of 26.7 kN, a transverse load of 2.0 kN was measured as a horizontal spring constant. The measurement values were expressed as the index in which comparative Example A1 was defined as 100. when the numerical values are larger, the horizontal spring constant is higher and the driving stability is more excellent.

The test results are shown in Table 1.

TABLE 1

|  | Comparative Examples | | | | | | Examples | | |
|---|---|---|---|---|---|---|---|---|---|
|  | A1 | A2 | A3 | A4 | A5 | A6 | A1 | A2 | A3 |
| <Bead reinforcing layer> | | | | | | | | | |
| Number of ply(s) (sheet) | 1 | 1 | 1 | 1 | 1 | 1 | 1 | 1 | 1 |
| Angle α of steel cord (°) | 50 | 25 | 35 | 75 | 90 | 50 | 50 | 40 | 70 |
| Strength of steel cord (N) | 900 | 900 | 900 | 900 | 900 | 500 | 900 | 900 | 900 |
| Height ho of outer piece portion (mm) | 30 | 30 | 30 | 30 | 30 | 30 | 30 | 30 | 30 |
| Cross section shape of inner apex portion | Triangular shape | | | L shape | | | | L shape | |
| Thickness Ta of raised piece portion (mm) | 6.5 | 2.0 | 2.0 | 2.0 | 2.0 | 2.0 | 2.0 | 2.0 | 2.0 |
| Height Ha (mm) | 45 | 45 | 45 | 45 | 45 | 45 | 45 | 45 | 45 |
| Thickness Tb of outer apex portion (mm) | 6.5 | 11.0 | 11.0 | 11.0 | 11.0 | 11.0 | 11.0 | 11.0 | 11.0 |
| Height Hb (mm) | 70 | 70 | 70 | 70 | 70 | 70 | 70 | 70 | 70 |
| Ratio (Ta/Tb) | 1 | 0.18 | 0.18 | 0.18 | 0.18 | 0.18 | 0.18 | 0.18 | 0.18 |
| <Test results> | | | | | | | | | |
| Bead durability (index) | 100 | 100 | 100 | 100 | 80 | 100 | 120 | 120 | 110 |
| Change in thickness of chafer rubber (%) | 100 | 130 | 120 | 115 | 120 | 115 | 90 | 95 | 90 |
| Bead durability after deterioration (index) | 100 | 90 | 95 | 100 | 90 | 90 | 120 | 120 | 110 |
| Driving stability (index) | 100 | 100 | 100 | 100 | 90 | 90 | 110 | 105 | 105 |

TABLE 1-continued

| | Examples | | | | | | | |
|---|---|---|---|---|---|---|---|---|
| | A4 | A5 | A6 | A7 | A8 | A9 | A10 | A11 |
| <Bead reinforcing layer> | | | | | | | | |
| Number of ply(s) (sheet) | 1 | 1 | 1 | 1 | 1 | 1 | 1 | 1 |
| Angle α of steel cord (°) | 50 | 50 | 50 | 50 | 50 | 50 | 50 | 50 |
| Strength of steel cord (N) | 700 | 900 | 900 | 900 | 900 | 900 | 700 | 1200 |
| Height ho of outer piece portion (mm) | 30 | 40 | 30 | 30 | 30 | 30 | 30 | 30 |
| Cross section shape of inner apex portion | | | | | L shape | | | |
| Thickness Ta of raised piece portion (mm) | 2.0 | 2.0 | 1.0 | 3.5 | 2.0 | 2.0 | 0.5 | 2.0 |
| Height Ha (mm) | 45 | 45 | 45 | 45 | 45 | 45 | 45 | 45 |
| Thickness Tb of outer apex portion (mm) | 11.0 | 11.0 | 10.0 | 10.0 | 8.0 | 7.0 | 10.0 | 6.0 |
| Height Hb (mm) | 70 | 70 | 70 | 70 | 70 | 70 | 70 | 70 |
| Ratio (Ta/Tb) | 0.18 | 0.18 | 0.10 | 0.35 | 0.25 | 0.29 | 0.05 | 0.33 |
| <Test results> | | | | | | | | |
| Bead durability (index) | 108 | 113 | 105 | 108 | 107 | 106 | 100 | 100 |
| Change in thickness of chafer rubber (%) | 95 | 90 | 90 | 90 | 90 | 90 | 90 | 90 |
| Bead durability after deterioration (index) | 105 | 110 | 103 | 105 | 103 | 103 | 100 | 100 |
| Driving stability (index) | 110 | 110 | 110 | 110 | 110 | 110 | 100 | 100 |

Next, comparison was made of bead durability and of driving stability using the tire of Example A1 of Table 1 as a reference while changing only the complex modulus of elasticity $E^*1$ of the inner apex portion. It should be noted that the complex modulus of elasticity $E^*2$ of the outer apex portion of each tire was standardized to 4.0 MPa.

TABLE 2

| | Examples | | | | |
|---|---|---|---|---|---|
| | A12 | A13 | A14 | A15 | A16 |
| Complex modulus of elasticity | 70 | 30 | 20 | 10 | 80 |
| Bead durability (index) | 120 | 120 | 100 | 100 | 120 |
| Driving stability (index) | 110 | 110 | 105 | 105 | 110 |

The test results confirmed that the tires of the examples were significantly improved in the durability of the bead portion.

[Test B]

Experimental heavy-load tires (size: 11R22.5) having the basic structure of FIG. 10 and the specifications shown in Table 3 were prepared, and were tested for the following performances. The specifications which are not illustrated in Table 3 are the same in each example. In Table 3, "polyester" and "nylon" are as follows.

Polyester: Polyester cord (Fineness 2000 dtex, Ends: 25 pieces/5 cm)

Nylon: Nylon cord (Fineness: 2000 dtex, Ends: 25 pieces/5 cm)

The test method is as follows.

The test of the bead durability, the change in the thickness of a chafer rubber, and the bead durability after deterioration were carried out in the same manner as in the test A. Evaluation is performed using an index in which comparative Example B1 is defined as 100.

TABLE 3

| | Comparative Examples | | | | Examples | | | | | |
|---|---|---|---|---|---|---|---|---|---|---|
| | B1 | B2 | B3 | B4 | B1 | B2 | B3 | B4 | B5 | B6 |
| <Bead reinforcing layer> | | | | | | | | | | |
| Number of ply(s) (sheet) | 1 | 1 | 0 | 1 | 1 | 1 | 1 | 1 | 1 | 1 |
| Angle α of steel cord (°) | 25 | 40 | — | 40 | 40 | 40 | 40 | 40 | 55 | 70 |
| Strength of steel cord (N) | 900 | 900 | — | 900 | 900 | 900 | 900 | 900 | 900 | 900 |
| Height ho of outer piece portion (mm) | 30 | 30 | — | 30 | 30 | 30 | 30 | 30 | 30 | 30 |

TABLE 3-continued

| <Heel cover layer> | | | | | | | | | | |
|---|---|---|---|---|---|---|---|---|---|---|
| Number of ply(s) (sheet) | 0 | 0 | 1 | 1 | 1 | 1 | 1 | 1 | 1 | 1 |
| Cord material | — | — | Polyester | Polyester | Polyester | Polyester | Polyester | Polyester | Polyester | Polyester |
| Cord angle γ(°) | — | — | 90 | 25 | 90 | 60 | 45 | 30 | 90 | 90 |
| <Test results> | | | | | | | | | | |
| Bead durability (index) | 100 | 102 | 90 | 100 | 105 | 108 | 110 | 105 | 102 | 101 |
| Change in thickness of chafer rubber (%) | 100 | 98 | 120 | 98 | 90 | 85 | 80 | 87 | 93 | 95 |
| Bead durability after deterioration (index) | 100 | 105 | 60 | 100 | 110 | 115 | 120 | 115 | 105 | 105 |

| | Examples | | | | | | | | |
|---|---|---|---|---|---|---|---|---|---|
| | B7 | B8 | B9 | B10 | B11 | B12 | B13 | B14 | B15 |
| <Bead reinforcing layer> | | | | | | | | | |
| Number of ply(s) (sheet) | 1 | 1 | 1 | 1 | 1 | 1 | 1 | 1 | 1 |
| Angle α of steel cord (°) | 40 | 40 | 40 | 40 | 55 | 25 | 90 | 70 | 55 |
| Strength of steel cord (N) | 900 | 900 | 900 | 700 | 1200 | 900 | 900 | 900 | 900 |
| Height ho of outer piece portion (mm) | 30 | 15 | 40 | 30 | 30 | 30 | 30 | 30 | 30 |
| <Heel cover layer> | | | | | | | | | |
| Number of ply(s) (sheet) | 1 | 1 | 1 | 1 | 1 | 1 | 1 | 1 | 1 |
| Cord material | Polyester | Polyester | Polyester | Polyester | Polyester | Polyester | Polyester | Polyester | Polyester |
| Cord angle γ(°) | 90 | 90 | 90 | 90 | 90 | 45 | 45 | 45 | 45 |
| <Test results> | | | | | | | | | |
| Bead durability (index) | 105 | 102 | 105 | 101 | 105 | 105 | 101 | 110 | 110 |
| Change in thickness of chafer rubber (%) | 90 | 95 | 90 | 95 | 90 | 90 | 90 | 80 | 80 |
| Bead durability after deterioration (index) | 110 | 105 | 110 | 105 | 110 | 110 | 105 | 120 | 120 |

What is claimed is:

1. A heavy-load tire comprising:
a carcass consisting of one carcass ply having a body portion extensive from a tread portion through a side wall portion to a bead core in a bead portion and a turned-up portion which extends from the body portion, which is turned up from an axially inner side to an axially outer side over the bead core, and which has an auxiliary turned-up portion;
a bead reinforcing layer which is disposed at the bead portion and has a reinforcing cord; and
a bead apex rubber which is disposed farther radially outwardly than the auxiliary turned-up portion of the carcass ply and which extends radially outwardly in a tapering manner, wherein:
the turned-up portion has: a main turned-up portion which curves along an axially inner side, a radially inner side, and an axially outer side of the bead core; and the auxiliary turned-up portion which extends from the main turned-up portion and extends toward the body portion through a vicinity of a radially outer side of the bead core;
the bead reinforcing layer has a U-shaped cross section including: an intermediate portion which extends farther radially inwardly than the main turned-up portion and along the main turned-up portion; an outer piece portion which extends from an axially outer side of the intermediate portion and which extends radially outwardly away from the turned-up portion along an axially outer side of the bead apex rubber; and an inner piece portion which extends from an axially inner side of the intermediate portion and which extends radially outwardly along the axially inner side of the body portion;
the reinforcing cord of the bead reinforcing layer has a cord strength of 700 to 1200 N and the reinforcing cord inclines at an angle of 40 to 70° relative to a circumferential direction of the tire at the outer piece portion;
the bead apex rubber has: an inner apex portion which is formed of a high complex elasticity modulus rubber and is disposed at a radially inner side; and an outer apex portion which is formed of a rubber whose complex elasticity modulus is lower than that of the rubber of the inner apex portion and is disposed at a radially outer side;
the inner apex portion has an L-shaped cross-section including: a bottom piece portion along a radially outer side of the auxiliary turned-up portion; and a raised piece portion which rises at an axially inner end side of the bottom piece portion and extends radially outwardly in a tapering manner along the body portion of the carcass ply;

a base line X1 is defined as a line orthogonal to an outer side of the tire through a point P which is disposed at an axially outer side of the bead apex rubber and has a distance of 25 mm radially outwardly from a bead base line;

on the base line X1, a thickness Tb of the outer apex portion is 7.0 to 13.0 mm and a thickness Ta of the raised piece portion of the inner apex portion is 1.0 to 4.0 mm; and the outer piece portion of the bead reinforcing layer contacts the point P, and both the outer piece portion and inner piece portion of the bead reinforcing layer extend radially outward from the base line X1.

2. The heavy-load tire according to claim 1, wherein:
a radial height Hb from a bead base line at a radially outer end of the outer apex portion is 40 to 100 mm; and
a radial height Ha from the bead base line at a radially outer end of the raised piece portion of the inner apex portion is not less than 35 mm and not more than the height Hb.

3. The heavy-load tire according to claim 1, wherein a Ta/Tb ratio of the thickness Ta of the raised piece portion to the thickness Tb of the outer apex portion is 0.10 to 0.35.

4. The heavy-load tire according to claim 1, wherein a complex modulus of elasticity $E*1$ of the inner apex portion is 20 to 70 MPa, and a complex modulus of elasticity $E*2$ of the outer apex portion is 2.0 to 6.0 MPa.

5. The heavy-load tire according to claim 1, wherein a radial height ho from the bead base line at a radially outer end of the outer piece portion of the bead reinforcing layer is greater than 25 mm and less than or equal to 40 mm.

6. The heavy-load tire according to claim 1, wherein:
the bead portion is provided with a heel cover layer composed of one or more cord plies having an organic fiber cord at at least one portion of an outermost side of a heel area defined below;
the organic fiber cord of the heel cover layer is arranged at an angle γ of 30 to 90° relative to a circumferential direction of the tire; and
the heel area is defined as an area sandwiched between a first straight line extending radially inwardly in a perpendicular manner to a bottom surface of a bead portion from a cross section center of the bead core and a second straight line extending axially outwardly in a perpendicular manner to the first straight line from the cross section center of the bead core.

* * * * *